Sept. 20, 1932.  T. ZACCHEO  1,878,748
APPARATUS FOR DISTRIBUTING MATERIAL
Filed July 7, 1930
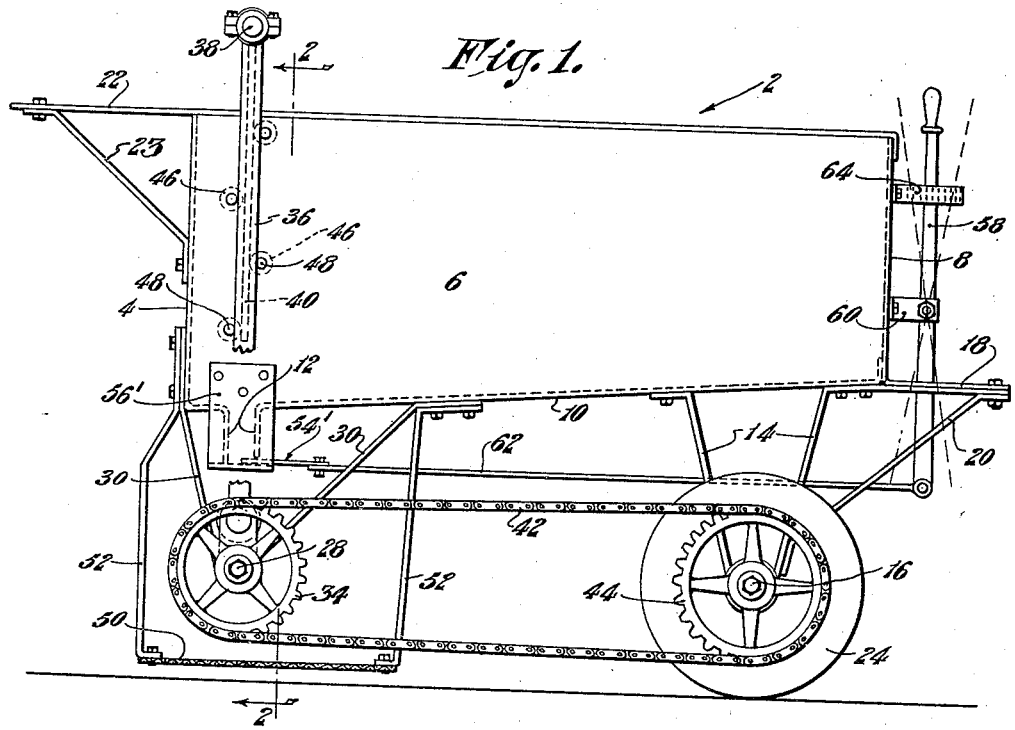
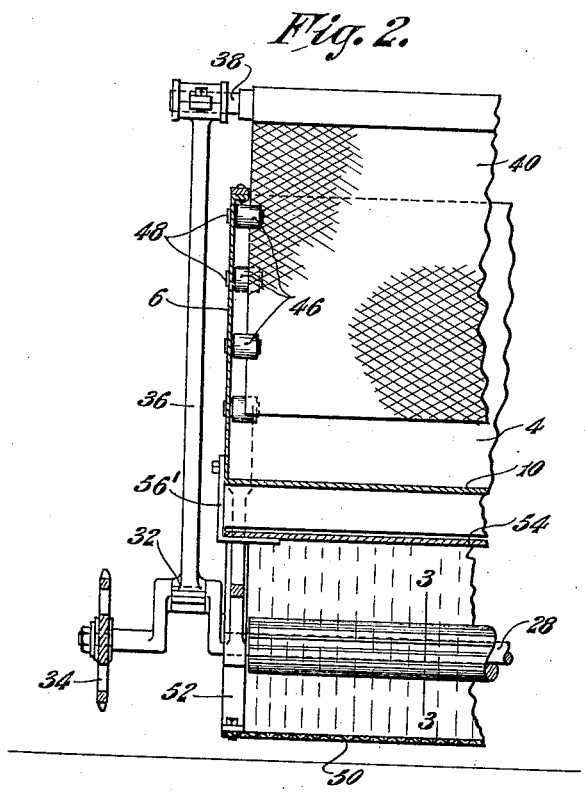
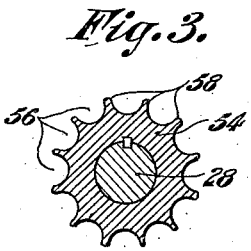
INVENTOR,
Thomas Zaccheo
BY
ATTORNEY.

Patented Sept. 20, 1932

1,878,748

UNITED STATES PATENT OFFICE

THOMAS ZACCHEO, OF WINDSOR LOCKS, CONNECTICUT

APPARATUS FOR DISTRIBUTING MATERIAL

Application filed July 7, 1930. Serial No. 466,158.

This invention relates to improvements in apparatus for distributing material and relates more particularly to improvements in apparatus for distributing and spreading material such as sand and the like on roadways and other surfaces.

The objects of the invention are the provision of apparatus of the class described which is simple in construction and efficient in operation and is accomplished by the novel combination and arrangement of parts to be hereinafter more fully described in connection with the accompanying drawing, in which:

Fig. 1 is a side elevational view of a distributing apparatus embodying the novel features of the invention.

Fig. 2 is a partial sectional elevational view taken on the line 2—2 of Fig. 1, and Fig. 3 is an enlarged sectional view on the line 3—3 of Fig. 2.

Referring now to the drawing in detail the novel features of the invention will be described.

A tank or body in the form of a receptacle is represented at 2 which has front, side and rear walls represented by 4, 6 and 8, as well as a lower wall 10. The lower wall is preferably inclined upwardly from the front wall as shown. This is so that sand or other material contained in the body will tend to flow forwardly thereof towards a transverse discharge slot 12 in said lower wall 10.

Bracket members 14 extend downwardly at the rear of the body and adjacent the sides thereof and carry an axle 16. A platform 18 extends outwardly from the rear end of the body which has its outer edge braced by struts 20 fixed thereto and the bracket members 14.

A tongue 22 extends outwardly from the forward end of the body and is suitably braced by struts 23 as shown. Wheels 24 at opposite ends of the axle 16 are for supporting the rear end of the body. The tongue may have an eye so as to be suitably connected to a tractor or other vehicle by which the forward end of the body may be supported, while at the same time it is hauled thereby along a roadway or the like for the distributing and spreading operation.

A shaft 28 is rotatable in bearing members 30 located at opposite sides of the body and adjacent the forward end thereof. This shaft has offset crank portions 32 at opposite ends thereof like that shown in 28 and at the outside the planes of the sides of the body. Sprockets 34 are fixed to the shaft 28 at opposite ends thereof. Connecting rods 36 rotatable on the crank portions of the shaft receive in their upper ends, rod portions 38 of an agitating member 40 which is preferably in the form of a screen.

Endless drive chains 42 engaging the sprockets 34 also engage similar sprockets 44 which are rotatable with the wheels 24. As the body 2 is hauled along a roadway and as the wheels 24 rotate the shaft 28 is rotated from the wheels by means of the chains and sprockets.

The screen 40 is disposed in a vertical plane at the forward end of the body and is preferably located over and above the discharge slot 12. This screen is guided for up and down movements between guide rolls 46 which are arranged in spaced and staggered relation and receive therebetween the opposite faces of the agitator screen at its opposite side edges. These rolls 46 are preferably mounted for rotation on studs or pins 48 carried by the inner faces of the side walls 6.

As the body 2 is hauled along the ground so as to rotate the wheels 24 and thereby the shaft 28, the screen is moved up and down by movements of the connecting rods 36. As the screen moves up and down material in the body is agitated and loosened so that it will flow freely through the discharge slot 12. In the case of sand this agitation has been found to be necessary, especially when the sand is damp or wet.

A perforated distributing member preferably in the form of a screen 50 is supported in a horizontal plane below the shaft 28 by means of brackets or end plates 52 depending from the lower wall of the body at the forward end thereof. A distributing member 54 having a plurality of longitudinal grooves 56 and ridges 58, which are alternately arranged, is carried by and is rotatable with the shaft 28.

As sand or other material is discharged through slot 12, it will fall onto the distributing member which as it rotates will distribute and spread the material over the screen 50. The grooves and ridges 56 and 58 comprising the distributer may be formed on the shaft or the distributer may comprise a separate part or parts fixed to the shaft.

A damper or shutter 54' is slidable below the slot 12 in and between brackets 56' carried by the sides 6 of the body as shown in Fig. 2. This damper is arranged to open and close said slot or to control the width thereof and thereby control the amount of sand discharged through the slot. A damper lever 58 is pivoted to a bracket 60 fixed to the rear wall of the body and its lower end is pivotally connected to one end of a link 62 that is connected at its other end to the damper 54. A plate 64 carried by the forward wall of the body is arranged to engage the lever 58 so as to hold it in various positions.

As the lever is swung in one direction or the other the damper is moved thereby to vary the amount of opening or width of the slot and in that way control the amount of sand discharged through the slot onto the distributer.

In operation with the tongue 22 attached to a tractor, truck or the like, the body may be hauled thereby along a roadway. The rear end of the body is supported by the wheels 24, while the forward end thereof is supported by the tractor so that the screen 50 is disposed above the ground.

As the body is hauled along the roadway and the wheels 24 are thereby rotated, the shaft 28 is rotated by means of the sprockets and chains so that the connecting rods 36 move the agitating screen 40 up and down. This movement of the screen agitates or loosens the sand or other material in the tank body so that it will flow through the slot 12 and fall onto the rotating distributing member 54. This distributing member throws the sand or distributes it evenly over the screen 50. The sand falls through the screen onto the roadway and as it is distributed more or less evenly on the screen 50 it is therefore likewise distributed more or less evenly on the roadway as the apparatus is moved thereover.

An operator may take a position on platform 18 so as to watch the operation of the apparatus and he may, by moving the lever 58 in one direction or the other, control the amount of sand to be distributed or spread upon the roadway.

Having described the invention in the form at present preferred, what I claim and desire to secure by Letters Patent of the United States is:

1. An apparatus for distributing material comprising in combination, a tank body having forward, side, rear and bottom walls, the said bottom wall being provided with a transverse slot adjacent said forward wall, wheels for supporting said body located adjacent said rear wall, a rotatable shaft below and parallel with said slot provided with a distributer formed by alternate longitudinal grooves and ridges, offset cranks at opposite ends of said shaft, a vertically disposed agitator extending between the side walls of the body guided for up and down movements by rolls on the inner faces of said side walls, connecting rods between said cranks and the upper side edges of said agitator, sprockets on opposite ends of said shaft and adjacent said supporting wheels connected by driving chains whereby the shaft is actuated by rotative movements of said wheel.

2. An apparatus for distributing material comprising in combination, a tank body having forward, side, rear and bottom walls, the said bottom wall being provided with a transverse slot adjacent said forward wall, wheels supporting said body located adjacent said rear wall, a rotatable shaft below and parallel with said slot provided with a distributer formed by alternate longitudinal grooves and ridges, offset cranks at opposite ends of said shaft, a vertically disposed agitator extending between the side walls of the body guided for up and down movements on the inner faces of said side walls, connecting rods between said cranks and the upper side edges of said agitator whereby said agitator is supported by said crank and reciprocated up and down accordingly as the shaft rotates, sprockets on opposite ends of said shaft and adjacent said supporting wheels connected by driving chains whereby the shaft is actuated by rotative movements of said wheels.

3. An apparatus for distributing material comprising in combination, a tank body having forward, side, rear and bottom walls, the said bottom wall being provided with a transverse discharge slot adjacent said forward wall, wheels for supporting said body located adjacent said rear wall, a rotatable shaft below and parallel with said slot provided with a distributer formed by alternate longitudinal grooves and ridges, a vertically disposed agitator extending between the side walls of the body and guided thereon for up and down movements, connecting rods between said cranks and the upper sides of said agitator whereby the agitator is supported by the cranks and moved up and down thereby, sprockets on opposite ends of said shaft and adjacent said supporting wheels connected by driving chains whereby the shaft is actuated by rotative movements of said wheels, a screen disposed below said agitator and a member below said slot to open and close the same.

In testimony whereof I affix my signature.

THOMAS ZACCHEO.